J. P. HEDSTROM.
SAW SHARPENING MACHINE.
APPLICATION FILED JAN. 9, 1905.
930,178.
Patented Aug. 3, 1909.
5 SHEETS—SHEET 4.
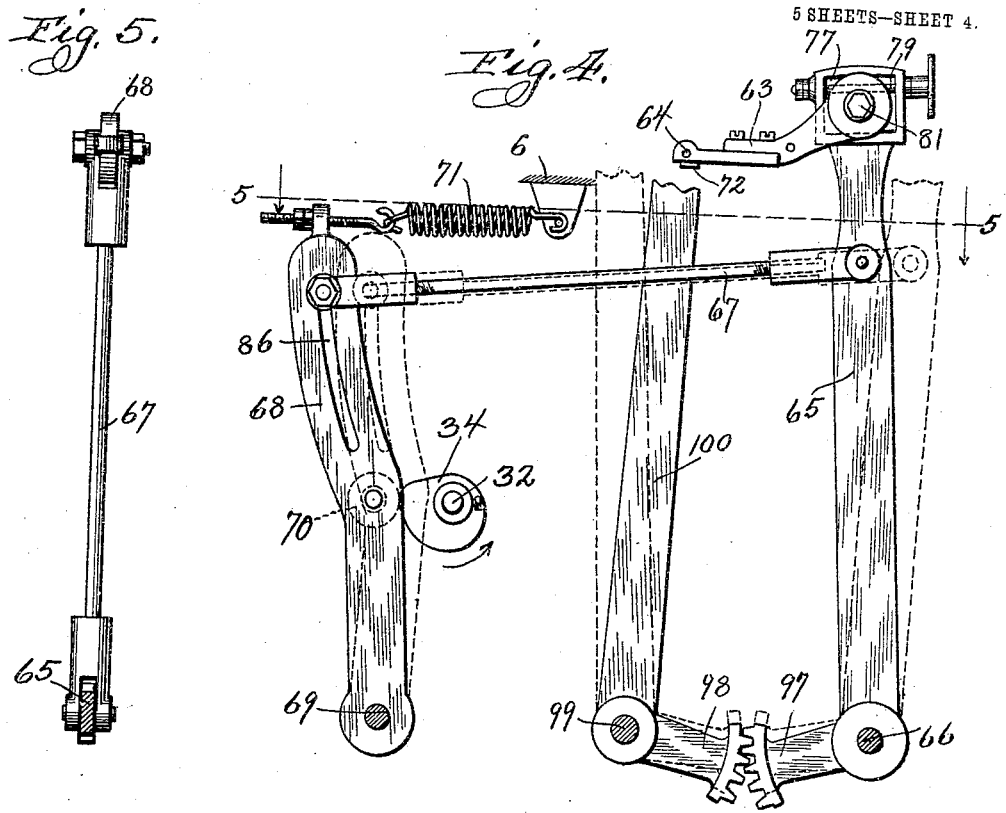
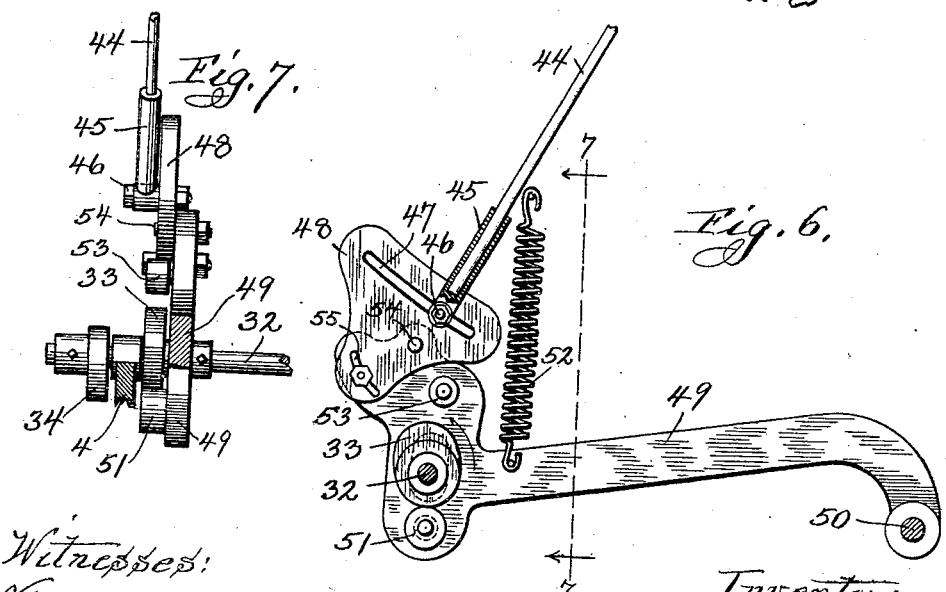
Witnesses:
Fred J. Schad Jr.
C. L. Orss
Inventor:
John Patrick Hedstrom
By R. J. Jackler
Atty.

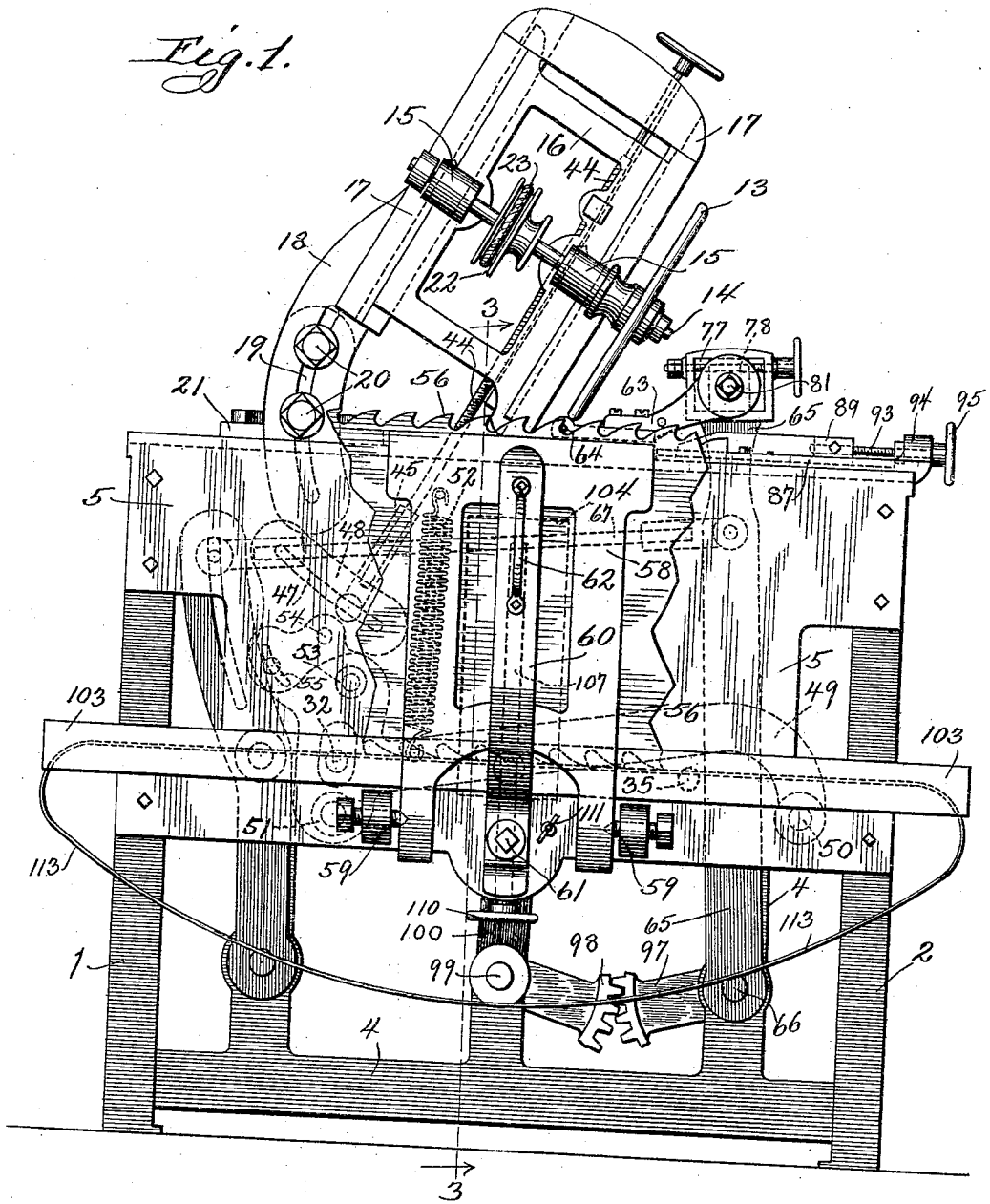

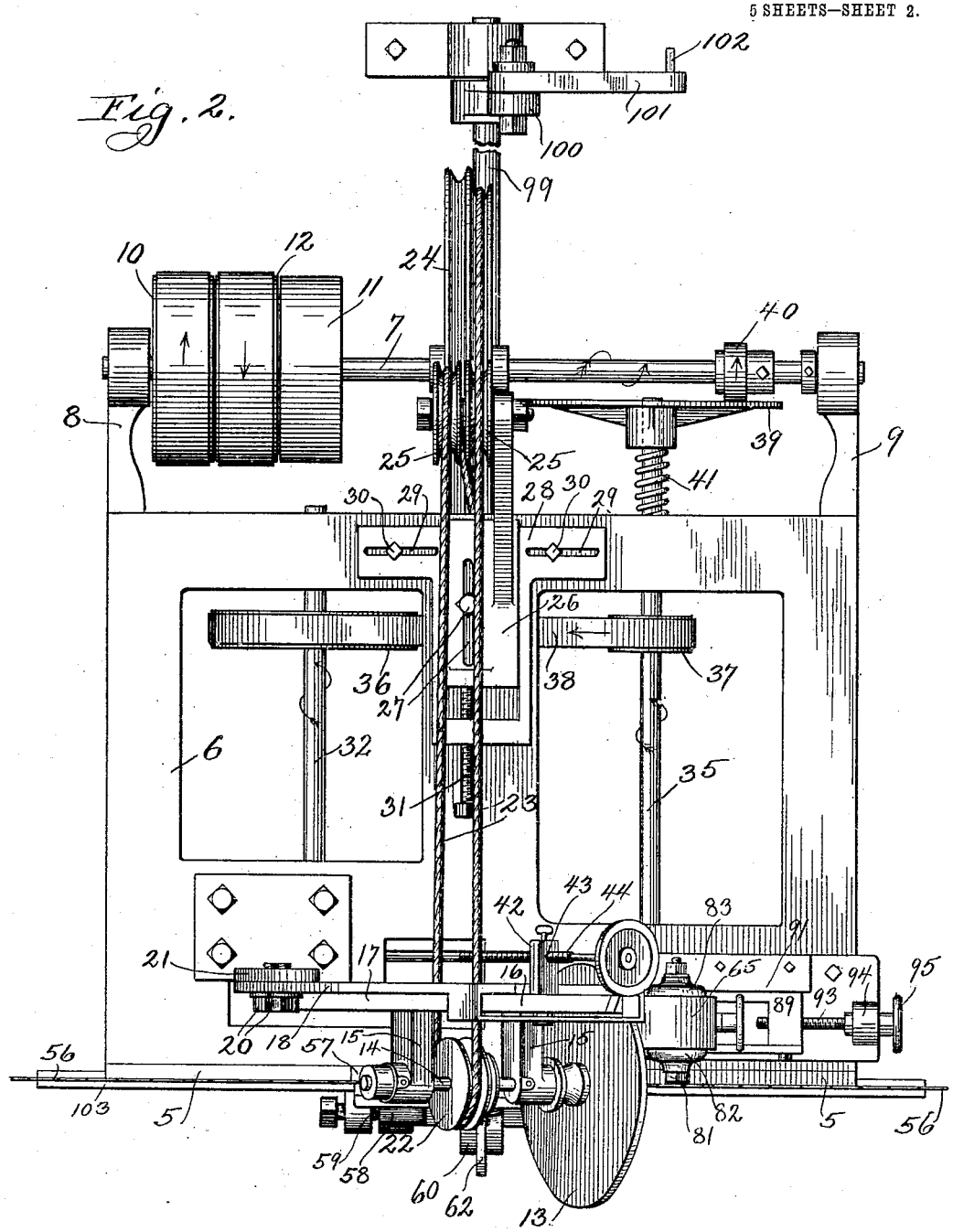

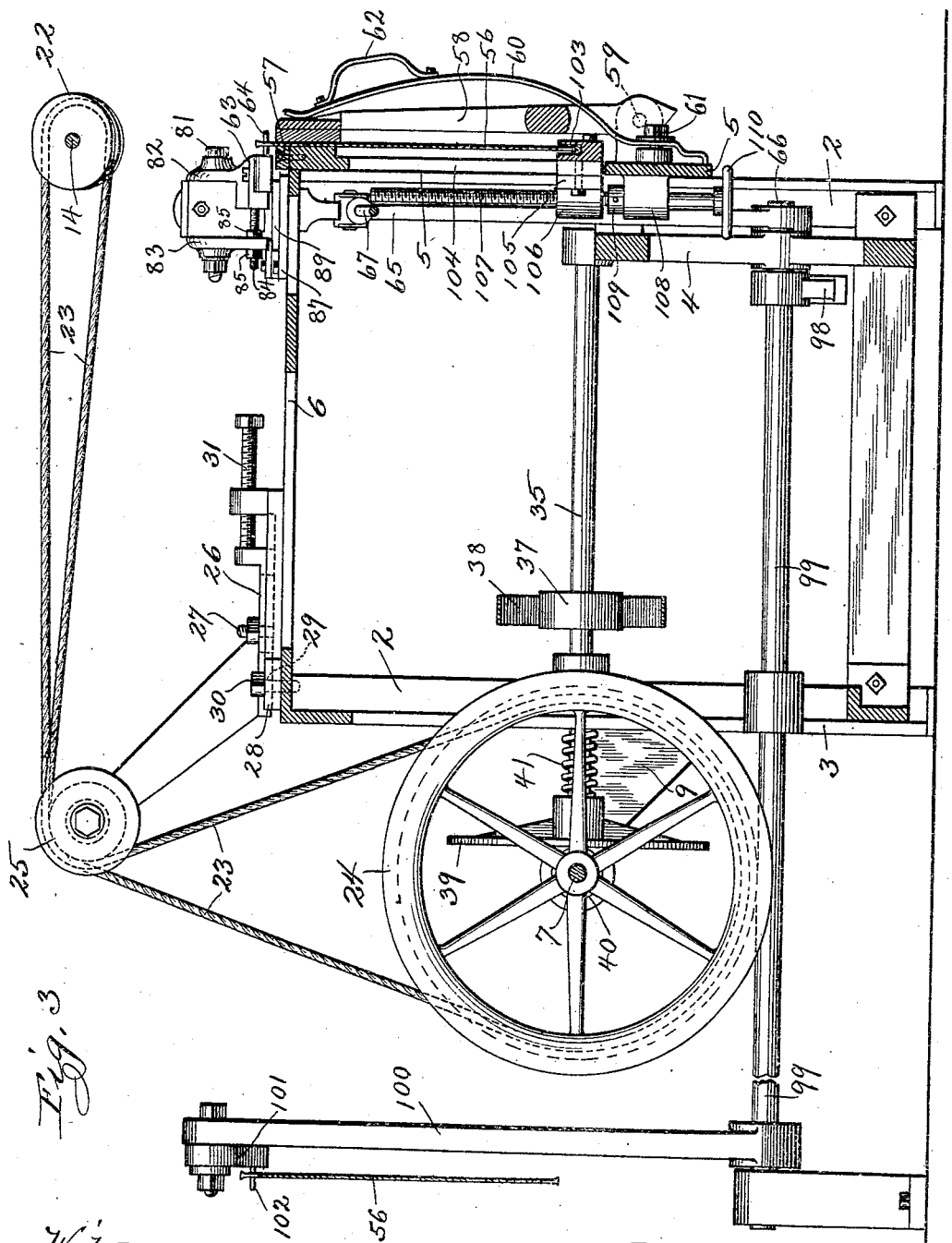

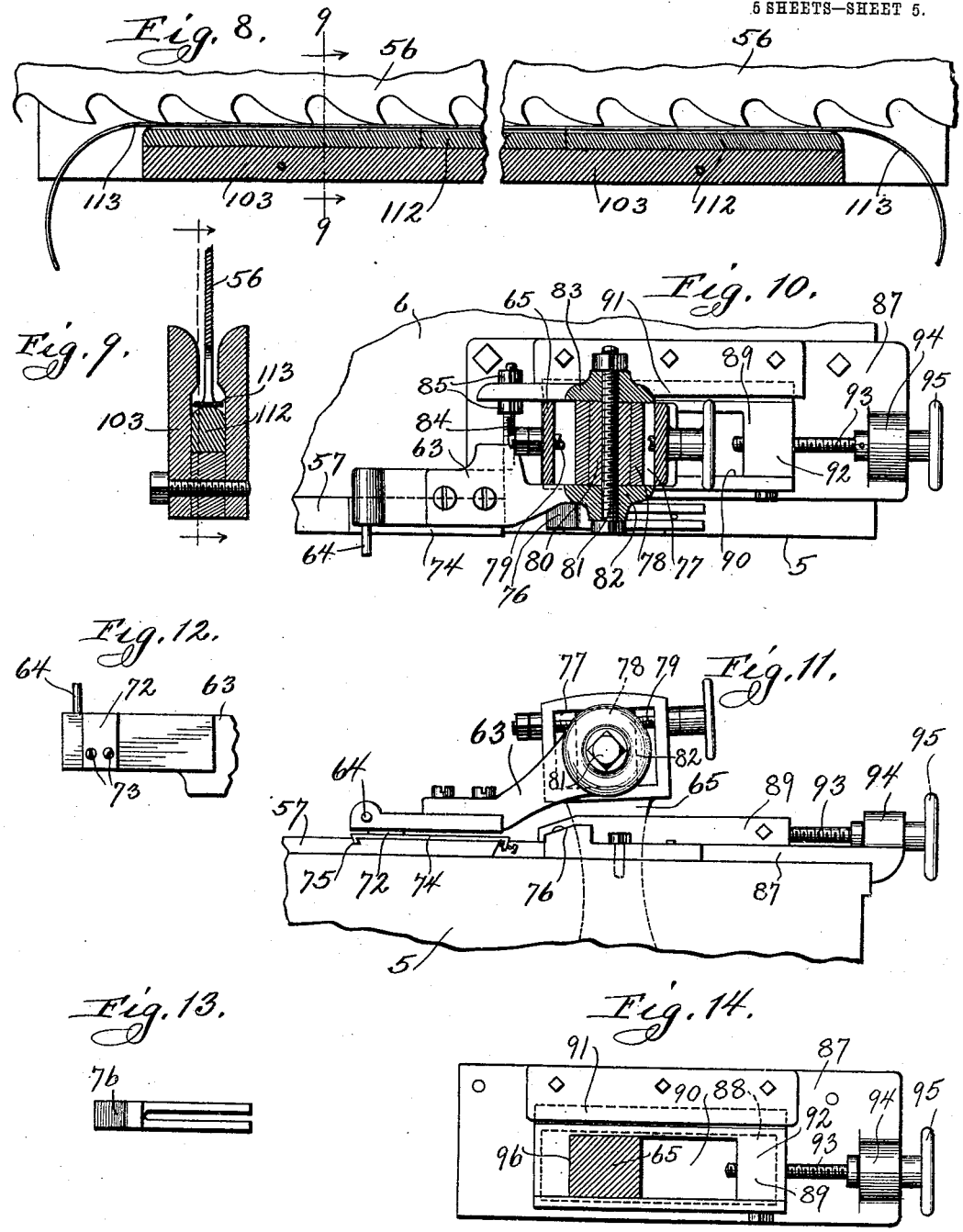

UNITED STATES PATENT OFFICE.

JOHN PATRICK HEDSTROM, OF CHICAGO, ILLINOIS, ASSIGNOR, BY MESNE ASSIGNMENTS, TO HANCHETT SWAGE WORKS, OF BIG RAPIDS, MICHIGAN, A CORPORATION OF MICHIGAN.

SAW-SHARPENING MACHINE.

No. 930,178.  Specification of Letters Patent.  Patented Aug. 3, 1909.

Application filed January 9, 1905. Serial No. 240,326.

*To all whom it may concern:*

Be it known that I, JOHN PATRICK HEDSTROM, a citizen of the United States, residing at Chicago, in the county of Cook and State of Illinois, have invented a new and useful Saw-Sharpening Machine, of which the following is a specification.

My invention relates to saw sharpening machines operated by power and which automatically feed the saw tooth by tooth under a reciprocating grinding wheel, especially adapted for band saws and the objects of my improvements are first to provide a novel and adjustable automatic shifting means for the grinding wheel; second, provide a new simple and efficient driving means for the grinding wheel; third, to so arrange the feed finger driving mechanism that no perceptible lost motion will be caused by the springing of the parts; fourth, to arrange a connection between the two feed fingers whereby the adjustment of one finger will adjust both; fifth, to facilitate the accurate stopping of the feed arm without bringing a strain on the feed finger; sixth, to provide a take up for the lateral wear on the feed finger; seventh, to make a novel and simple construction whereby the machine can be adjusted to sharpen a double edged saw, and still other objects to become apparent from the description to follow.

I am aware that automatic saw sharpening machines have been made before my invention, and these have always had some more or less serious objectionable features which I aim to overcome by my invention which is illustrated on the accompanying five sheets of drawings forming a part of this specification in which:—

Figure 1, is a front elevation of the complete machine; Fig. 2, is a plan of the same; Fig. 3, is a section on line 3—3 of Fig. 1; partly in elevation and with parts omitted; Fig. 4, is a detail of the feed finger and its connections; Fig. 5, is a plan of a connecting rod shown in Fig. 4; Fig. 6 is a front view in detail of the mechanism for shifting the grinding wheel; Fig. 7, is a section on 7—7 of Fig. 6; Fig. 8, is a longitudinal section through the double edge saw support forming a part of my invention; Fig. 9, is a section on 9—9 of Fig. 8; Fig. 10 is a detailed plan view of the feed finger partly in section and its associated parts; Fig. 11, is a front elevation of the same; Fig. 12, is a bottom plan of the feed finger broken away; Fig. 13, is a plan of the feed finger back stop block and Fig. 14, is a plan of the feed arm stop block.

Similar reference characters refer to similar parts throughout the several views.

The frame of the machine consists of the two side members 1 and 2, the rear member 3, the front member 4, the front plate 5 and the top 6, to which different brackets and blocks are secured. The main driving shaft 7 is at the rear of the machine journaled in the bearing brackets 8 and 9 secured to the frames 1 and 2 respectively.

Secured to the shaft 7 adjacent to the bracket 8 are the belt wheels 10 and 11 and mounted loosely on said shaft between the wheels 10 and 11 is the belt wheel 12. Two belts a straight one and a crossed one which pass around the same wide pulley on a counter shaft not shown, pass around the pulleys 10 and 12 as shown in Fig. 2, and are arranged to be shifted to occupy a position on the pulleys 12 and 11.

Band saws are made right and left hand, and the machines for sharpening them must be made right and left hand; the machine which I have illustrated is a left hand machine. When the saw is in proper position in the grinding machine it encircles the machine. It is possible to sharpen a right hand saw on a left hand machine, by placing the saw into the machine so that it does not encircle the machine and reversing the direction of rotation of the grinding wheel. The direction of rotation of the grinding wheel is the same as that of the driving shaft 7, hence if the direction of rotation of the driving shaft 7 is reversed the direction of rotation of the grinding wheel is reversed. The direction of rotation of the driving shaft 7 is reversed by shifting the belts on to the wheels 12 and 11.

The grinding wheel 13 is secured to the end of the spindle 14 which is journaled in the bearings 15 on the gate 16, which is arranged to slide in the frame 17. The frame 17 is adjustably secured to the top frame 6 in such manner that it can be swung in an arc about an axis which is at right angles to the saw blade. I have shown one means of securing the frame 17 to the top 6 but any desired means may be adopted, in place of that shown, which consists of an arm 18 integral with the frame 17 provided with an arcuate slot 19 and clamping bolts 20 to secure said arm 18 to a bracket 21 provided with an arcuate slot concentric with the slot 19.

Different saws are provided with teeth inclined at different angles and to grind these properly the grinding wheels 13 must be adjusted to the proper angle; this is accomplished by adjusting the frame 17 to any desired angle by the construction described.

To drive the grinding wheel 13 a pulley 22 is secured on the spindle or shaft 14 and a belt drive 23 connects this pulley 22 to a large pulley 24 secured on the drive shaft 7. At some point intermediate the pulley 22 and pulley 24 preferably secured to the rear part of the top 6 are two idlers 25 over which is passed the belt 23 which is preferably a round belt. The idlers 25 are conveniently mounted to serve as belt tighteners on a bracket 26 arranged to be adjusted by means of the slot and bolt 27. When the frame 17 is adjusted to different angles obviously the pulley 22 is also moved to a different position, and to be able to shift the idlers 25 to be in alinement with pulleys 24 and 22, the bracket 26 is arranged to have lateral adjustment; by being secured to a plate 28 provided with the slots 29 through which pass the bolts 30 to secure the plate 28 to the top 6. To adjust the plate 28 laterally the bolts 30 are turned loose and the attendant moves the plate, bracket 26 and idlers 25 to the desired position by hand after which the bolts 30 are again turned to clamp the plate 28 in position. The bracket 26 is similarly adjusted on the plate 28, but instead of the attendant moving the same by hand it may be accomplished by providing a screw 31 threaded into a lug or bracket on the plate 28 and resting against the bracket 26.

The grinding wheel 13 must be revolved swiftly to accomplish the work desired of it, and when it becomes reduced in diameter from constant wear, the speed of the spindle 14 must be increased to retain the same peripheral speed of the grinding wheel. This is attained by providing a plurality of different sized pulleys 24 on the shaft 7 and a plurality of different sized pulleys 22 on the spindle 14. To increase the speed of the spindle 14 a larger pulley 24 and a smaller pulley 22 is connected by the belt 23. Besides rotating the grinding wheel 13 the drive shaft 7 communicates power to a cam shaft 32 to which are secured a cam 33 for raising and lowering the grinding wheel 13 and a cam 34 for feeding the saw along. The shaft 32 is journaled in the front frame 4 and the rear frame 3. An intermediate counter shaft 35 is also journaled in the front frame 4 and the rear frame 3 parallel to the shaft 32, and is operatively connected to the shaft 32 by means of the large belt wheel 36 secured to shaft 32, the small belt wheel 37 secured to shaft 35 and the belt 38. The shaft 35 is driven by the shaft 7 through the medium of a large friction disk 39 secured to the end of shaft 35 and a small friction wheel 40 secured on shaft 7. The disk 39 is secured on the shaft 35 to have longitudinal movement thereon but prevented from rotating on said shaft as by a feather; and a coiled expanding spring 41 is interposed between the disk 39 and the rear frame 3 to constantly press the disk 39 which is preferably metal against the wheel 40 which is preferably paper. From the description thus far given it will be seen that the speed of the cam shaft 32 is very much less than the speed of the spindle 14, which is an absolute necessity in machines of this class. It is sometimes very desirable to change the comparative speed of the shaft 32 and shaft 7; as for instance when a very small cut is being taken off of the saw teeth. It will be understood that the greater the speed of the cam shaft 32 is, the faster the saw will be fed along through the machine, because as will be described every revolution of the cam shaft 32 moves the saw along one tooth. When it is desired to feed the saw along slowly the friction wheel 40 is moved along on shaft 7 until it contacts the disk 39 near its peripheral edge and is then secured to shaft 7 as by a set screw; and when it is desired to feed the saw along fast the friction wheel 40 is secured to shaft 7 so that it will contact the disk 39 near its center: Shafts 7 and 35 should lie in the same horizontal plane to derive the best possible results from the frictional driving means between them, just described. In operation the cam shaft 32 must always rotate in the direction indicated by the arrows in Figs. 2, 4 and 6; so that when the direction of rotation of the shaft 7 is reversed to grind a right hand saw, as above referred to, the friction wheel 40 is shifted on the shaft 7 to a position beyond the center of the disk 39.

To the rear of the sliding frame 16 which carries the grinding wheel is secured a swiveled post 42, provided with a screw-threaded hole 43, through which is fitted the long screw threaded rod or shaft 44. The upper end of the rod 44 is provided with a hand wheel by means of which it can be turned, and the lower end of the rod 44 is smooth and rests in a socket provided in the end connection 45, which is pivotally connected to an adjustable pin or bolt 46, secured in the arcuate slot 47, provided in the plate 48. The plate 48 is adjustably secured to the free end of a long arm 49 pivoted at one end 50 to the front frame 4. The arm 49 is provided preferably directly below the plate 48 with an elongated opening through which the shaft 32 passes. The cam 33 is secured to the shaft 32 adjacent to the arm 49, and an antifriction roller 51 which is secured to the arm 49 below the shaft 32 is held in constant contact with the cam 33 by a strong contracting coiled spring 52 interposed between the arm 49 and the top frame 6. The spring 52 has a strong enough tension to overcome the combined weight of the arm 49, plate 48 rod 44, sliding frame 16, grinding wheel 13 and the bearings, spindle, etc., which are carried by the frame 16. By this construction the enormous weight of these parts is removed from the cam and cam shaft used to operate these parts, thus prolonging the life of these working parts. Furthermore it will be seen that the gate 16 with the grinding wheel 13 will only lower and feed against the saw by force of gravity because the lower end of rod 44 fits loosely in the socket 45. This guards against any serious accident taking place from too rapidly feeding the grinding wheel against the saw. In case the spring 52 should at any time give out or become broken an antifriction roller 53 is secured to the arm 49 above the cam 33 which can be used temporarily until the proper repairs can be made.

The slot 47 is provided in the plate 48 to enable the adjustment of the movement of the gate 16 to longer or shorter teeth in the different saws, and to increase the distance of this adjustment the plate 48 is pivoted to the arm 49 at 54 and is provided with the arcuate slot 55 through which a bolt is passed to secure it to the arm 49. The operation is that as the shaft 32 rotates the cam 33 will operate the arm 49 against the tension of the spring 52 and cause the gate 16 and therefore the grinding wheel 13 to move up and down. To finally adjust the grinding wheel 13 to the saw, the screw threaded rod 44 is turned in the swiveled post 42, and after it is properly adjusted the rod 44 may be locked by a set screw or otherwise.

The saw 56 in the drawings is shown to be a double edged left hand saw and in Fig. 1 is broken away to illustrate the machine to better advantage. To retain the upper edge of the saw, i. e., the edge being sharpened, in proper alinement under the grinding wheel the lower edge of the saw is supported in a guide to be described and the upper edge is clamped against a shoe 57 secured to the front plate 5, by a spring pressed pivoted clamp 58. The clamp 58 is preferably pivoted at 59 on two set screws secured in lugs extending forward from the front plate 5. The spring 60 for said clamp is preferably adjustably and pivotally secured to the front plate 5 at 61, and is provided with a handle 62 to pull it away from the clamp and turn it on its pivot.

The mechanism constructed for feeding or moving the saw along tooth by tooth embodies several novel features and advantages which have never heretofore been used, and consists of the feed finger 63 provided with a push pin 64, pivoted to the upper free end of the feed arm 65, which is pivoted at 66 to the front frame 4, and is connected nearest its upper end by the connecting rod 67 to the free end of the lever 68 which is pivoted at 69 to the front frame 4 and is provided with the antifriction roller 70 which is held in constant contact with the cam 34 by a coiled contracting spring 71 connected between the top end of the lever 68 and the top 6. The finger 63 is moved back and forward close alongside the saw 56 by the rotation of the cam 34 by means of the connections just described. The pin 64 extends out from one side of the finger 63 into the path of the saw 56 and catches into the front side of the teeth of the saw when moving in one direction and slides over the back of the teeth when moving in the other direction. When the pin 64 catches against the front side of a tooth it moves the saw along the distance of one tooth. To prevent any downward thrust on the saw by the pin 64 when it is moving the saw the bottom side of the finger 63 rides along on top of the shoe 57. From constant use the contacting surfaces of the finger 63 and shoe 57 become worn and require to be replaced. To facilitate the cheap and easy replacing of these parts, I secure to the bottom of finger 63 the wearing plate 72 by screws 73, see Figs. 11 and 12 and to the top of the shoe 57 the wearing plate 74. The plate 74 is secured to the shoe 57 by inserting the acutely bent end of the plate 74 into an inclined slot 75 in the shoe 57 and securing the remaining end of said plate to said shoe by a set-screw. The finger 63 in operation moves a greater distance than the distance from one tooth of the saw to another so that when moving back the pin 64 drags up over the back of the next succeeding tooth thereby lifting the finger 63 from the shoe 57. Heretofore when the pin 64 is passed beyond the point of the tooth in its backward movement the finger 63 was allowed to drop by gravity, and the full force of the finger thus falling was exerted against the back of the next succeeding tooth by the pin 64 contacting with said tooth. This striking force was greater or less according to the weight of the finger 63, and to a degree equal to the striking force tended to move the saw backward. To prevent this gravitating force of the finger striking against the back of the saw teeth I provide on the top edge of the front plate 5 underneath and slightly to the rear of the finger 63 an inclined lug 76 provided with means for adjusting it toward or away from the finger 63. The lug 76 is so adjusted that the bottom of the finger 63 will strike upon the same when the pin 64 is moved back beyond the point of a tooth of the saw, thus the gravitating force of the finger 63 will be exerted against the lug 76 and will not affect the position of the saw.

To adjustably pivot the finger 63 to the feed arm 65 the upper end of the arm 65 is provided with the rectangular opening 77 in which is fitted to slide the rectangular block 78. An adjusting screw 79 is threaded through the block 78 and passed loosely through perforations provided in two opposing walls of the opening 77 on the exterior of which it is provided with a hand wheel on the one end and locking nuts on the remaining end. A cylindrical sleeve 80 extends through an aperture provided therefor in the block 78, and a bolt 81 extends longitudinally through said sleeve, see Fig. 10. The finger 63 is provided with two side members 82 and 83 which are tightly clamped against the ends of the sleeve 80 by the bolt 81, the sleeve 80 being slightly longer than the block 78. The members 82 and 83 are rigidly but adjustably secured together some distance in front of the arm 65 by a screw-threaded rod 84 secured rigidly to one member and passing through a perforation in the other member with a lock nut 85 on either side of said latter member to enable the adjustment of the rod 84 in said perforation. By this construction when the finger 63 from constant use becomes worn and loose in its bearings the lateral lost play can be taken up by adjusting the nuts 85.

The forward movement of the feed arm 65 is what feeds the saw forward, and it is important that this forward movement be positively limited and the arm be stopped at the same point each time. Of course the forward throw of the feed arm 65 it will be understood is approximately regulated by shifting one end of the connecting bar 67 in the arcuate slot 86 provided in the lever 68, but unless some provision is made to prevent it the momentum of the lever 68, connecting rod 67, arm 65 and its connections would cause the arm 65 to stop at different points at the end of its forward movements. To provide an adjustable stop for the arm 65 a plate 87 having an elongated opening 88 is secured to the top 6 in such position that the arm 65 extends through the opening 88. Mounted to slide on the plate 87 is the stop block 89 provided with the elongated opening 90 through which the arm 65 projects and one edge of said block extends under a flange 91 arranged to be secured to the plate 87. The end 92 of the block 89 is provided with a screw threaded hole into which is fitted a screw 93 passed through a smooth hole in a lug 94 on plate 87, and is prevented from having longitudinal movement in said lug by a collar on one side thereof and a hand wheel 95 on the other side thereof which are fixed to said screw 93. The arm 65 is stopped in its forward movement by striking against the end 96 of the elongated opening 90 in the block 89. The block 89 can be adjusted to the proper position by the screw 93 and then clamped in such position by the flange 91.

As previously stated the band saw encircles the machine when in position to be sharpened, and besides being supported by a guide secured to the machine it is supported by a plurality of standards not shown distributed at proper intervals around the entire loop of the saw. The feed arm 65 moves one side of the saw loop and to properly move the saw around the opposite side of the saw loop must be moved by a feed arm also. Heretofore the mechanism employed to operate the feed arm remote from the machine required a separate adjustment each time that the feed arm on the machine was adjusted to feed differently. The mechanism which I employ is automatic in its adjustment, i. e. when the feed arm on the machine is adjusted the other feed arm is also adjusted; which consists of extending the pivot 66 of the feed arm 65 in the shape of a shaft and securing thereto a segmental gear 97 which meshes with a segmental gear 98 secured to a shaft 99 to which is secured the feed arm 100 which is provided with a feed finger 101 having a pin 102 to engage the teeth of the saw. It will be seen that by this construction, when the feed arm 65 is adjusted to a certain length of stroke the arm 100 will also be adjusted.

The lower edge of the saw rests in an adjustable guide and support 103 which is provided with a rearwardly extending rectangular block arranged to slide in the vertical way 104 provided in the front plate 5. A rear plate 105 is secured to the rectangular block to prevent it from leaving the way 104 and has a rearwardly extending lug or boss 106 provided with a vertical screwthreaded hole, into which is fitted the vertical screw 107. The lower end of the screw 107 below the boss 106 passes freely through a perforation in a lug 108 on the rear side of the plate 5. A collar 109 is fixed on the screw 107 to rest on the upper side of the lug 108 and prevent any downward movement of the screw 107 through the lug 108. The lower end of the screw 107 is provided with a hand wheel 110 to turn the screw to adjust the guide 103. A thumbscrew 111 may be provided in the plate 5 for clamping the screw 107 in place after it has been adjusted.

To make an absolutely level seat in the guide 103 for the saw to rest on and to prevent the sharpened teeth being made dull, the bottom of the saw groove in the guide 103 is provided with a plurality of hardened steel bars 112 having their upper surface made in the form of a longitudinal ridge, and upon these blocks 112 is laid an endless band of spring steel 113. The saw teeth rest on the top of this steel band 113, and the frictional contact between the saw-teeth and band 113 being greater than the frictional contact between the band 113 and the blocks 112, the band 113 will travel along with the saw and relieve the teeth of all friction.

It will be understood that numerous changes can be made in parts of this machine in construction and arrangement without in the least departing from the spirit of the invention.

Having thus fully described my invention what I claim as new and desire to secure by Letters Patent of the United States is:—

1. In a saw-sharpening machine, a suitable frame, a gate carrying a grinding wheel guided to slide in a vertical plane, a driving shaft mounted in said frame, an endless belt for communicating power from said driving shaft to said grinding wheel, a pivoted arm arranged to have its free end depressed by a cam, a compound push rod free to extend in length having its upper end pivotally connected to said gate and its lower end pivotally connected to the free end of said arm, means operatively connected to said driving shaft for rotating said cam, and a spring connected to the free end of said arm to normally hold it in a raised position against said cam, the parts being so arranged and connected that the grinding wheel will normally be held in a raised position by said spring and will lower by gravity when the free end of said arm is depressed.

2. In a saw sharpening machine, a gate carrying a grinding wheel guided to slide in a vertical plane, means for driving said grinding wheel, a pivoted arm arranged to have its free end depressed by a cam, a compound push rod free to extend in length having its upper end pivotally connected to said gate and its lower end pivotally connected to said arm, means for rotating said cam, and a spring connected to said arm to normally hold its free end raised and against said cam, the parts being so arranged and connected that the grinding wheel will normally be held in a raised position by said spring and will lower by gravity when the free end of said arm is depressed by said cam.

3. In a saw sharpening machine, a gate carrying a grinding wheel guided to slide in a vertical plane, a pivoted arm, means for raising and lowering the free end of said arm, a plate provided with two slots adjustably secured to the free end of said arm, set screws securing said plate and said arm together and a rod having its upper end pivotally connected to said gate and its lower end pivotally connected to a block adjustably secured in said slotted plate whereby the range of adjustment between said gate and said arm is materially changed.

4. A guide and support for a saw provided with a slot in its upper side to receive the saw and an endless band in the bottom of said slot on which the saw rests.

5. In a band-saw sharpening machine, a feed arm provided with a feed finger for moving one side of the saw loop, a second feed arm provided with a feed finger for moving the other side of the loop, and mechanism connecting said two feed arms whereby the adjusting of the first named feed arm will adjust the second named feed arm.

6. In a band-saw-sharpening machine, a feed arm provided with a feed finger for moving one side of the saw loop secured to a rockshaft, a second feed arm provided with a feed finger for moving the other side of the saw loop secured to a second rockshaft, and a segmental gear secured to the first named rock shaft meshing with a segmental gear secured to the second named rock shaft whereby motion and adjustment applied to the first named feed arm is transmitted to the second named feed arm.

7. In a saw sharpening machine, a frame, a grinding wheel, means for moving the grinding wheel, a saw guide adjustably secured to said frame, a feed arm and means for actuating said feed arm, and a stop block adjustably secured to said frame provided with a slot in which the upper end of said feed arm is fitted to move and engage one end of said slot.

In testimony whereof I have signed my name to this specification in the presence of two subscribing witnesses this 24th day of December 1904 at Chicago Illinois.

JOHN PATRICK HEDSTROM.

Witnesses:
FRANK G. WESTLUND,
NELS. JOHNSON.